US008916620B2

(12) United States Patent
Kaplan et al.

(10) Patent No.: US 8,916,620 B2
(45) Date of Patent: Dec. 23, 2014

(54) PROCESS FOR POLYURETHANE-MODIFIED POLYISOCYANURATE FOAM WITH IMPROVED THERMAL STABILITY

(75) Inventors: Warren A. Kaplan, Libertyville, IL (US); Angelo R. Gabbianelli, Waukegan, IL (US); David J. Norberg, Grayslake, IL (US)

(73) Assignee: Stepan Company, Northfield, IL (US)

( * ) Notice: Subject to any disclaimer, the term of this patent is extended or adjusted under 35 U.S.C. 154(b) by 0 days.

(21) Appl. No.: 13/591,077

(22) Filed: Aug. 21, 2012

(65) Prior Publication Data

US 2013/0023597 A1 Jan. 24, 2013

Related U.S. Application Data

(63) Continuation of application No. 12/080,109, filed on Apr. 1, 2008, now abandoned.

(51) Int. Cl.
*C08G 18/09* (2006.01)

(52) U.S. Cl.
USPC ........ 521/108; 521/106; 521/107; 521/109.1; 521/170; 521/172; 521/174; 521/902

(58) Field of Classification Search
CPC .......... C08J 9/0028; C08J 9/0038; C08J 9/12; C08J 9/125; C08J 9/127; C08J 9/141; C08G 18/022; C08G 18/791; C08G 2101/00; C08G 2102/0025; C08G 2105/02
USPC .............. 521/106, 107, 108, 109.1, 170, 172, 521/174, 902
See application file for complete search history.

(56) References Cited

U.S. PATENT DOCUMENTS

| | | | |
|---|---|---|---|
| 3,509,076 A | 4/1970 | Anderson | |
| 3,849,349 A | 11/1974 | Franklin et al. | |
| 3,876,568 A | 4/1975 | Wysocki | |
| 3,909,465 A | 9/1975 | Wiedermann et al. | |
| 3,919,128 A | 11/1975 | Baldino et al. | |
| 4,097,400 A | 6/1978 | Wortmann et al. | |
| 4,129,693 A | 12/1978 | Cenker et al. | |
| 4,468,481 A | 8/1984 | Barda et al. | |
| 4,505,849 A | 3/1985 | Staendeke et al. | |
| 4,595,711 A | 6/1986 | Wood | |
| 5,252,625 A * | 10/1993 | McLaughlin et al. | ........ 521/125 |
| 5,322,914 A | 6/1994 | McInnis et al. | |
| 5,420,169 A | 5/1995 | Schumacher et al. | |
| 5,464,561 A | 11/1995 | Williams et al. | |
| 5,750,586 A | 5/1998 | Adams et al. | |
| 5,776,992 A * | 7/1998 | Jung et al. | ..................... 521/106 |
| 5,922,779 A | 7/1999 | Hickey | |
| 5,981,612 A | 11/1999 | Keppeler et al. | |
| 6,319,962 B1 * | 11/2001 | Singh et al. | ................... 521/170 |
| 6,359,022 B1 | 3/2002 | Hickey et al. | |
| 6,359,023 B1 | 3/2002 | Kluth et al. | |
| 6,372,811 B2 | 4/2002 | Singh et al. | |
| 6,433,121 B1 | 8/2002 | Petrovic et al. | |
| 6,472,448 B2 * | 10/2002 | Witte et al. | ................... 521/169 |
| 7,125,950 B2 | 10/2006 | Dwan'Lsa et al. | |

FOREIGN PATENT DOCUMENTS

| | | |
|---|---|---|
| CN | 101003611 | 7/2007 |
| DE | 261059 | 10/1988 |
| EP | 0441135 | 1/1991 |
| JP | 6091671 | 4/1992 |
| JP | 11140150 | 5/1999 |

OTHER PUBLICATIONS

Bugajny, M et al., "Thermoplastic polyurethanes as carbonization agents in intumescent blends. Part: Thermal behavior of polypropylene/thermoplastic polyurethane/ammonium polyphosphate blends", Chemical Abstracts Service, XP-002537867, Journal of Fire Sciences Technomic Publ. Co. Inc. Database Accession No. E2000245154791 Jan. 2000 , 7-27.
Anonymous, "Ecopol 123", Internet Article, 2007, XP002537864, URL:http://www.ecopur.com.mx/english/ecopol123. html>[retrieved on Jul. 20, 2009] 2007.
"Fire Retardancy of Polymers: The Use of Intumescence", Royal Society of Chemistry, Cambridge, United Kingdom 1998 , 51-63.
Modesti, M et al., "Influence of different flame retardants on fire behavior of modified PIR/PUR polymers", Chemical Abstracts Service, XP-002537866; database accession No. 2001-831884 Columbus, OH Nov. 16, 2001.
Modesti, M et al., "Flame retardancy of polyisocyanurate—polyurethane foams: use of different charring agents", Chemical Abstracts Service, XP-002537866 database accession No. 2002:724950 Sep. 24, 2002.
"International Search Report and Written Opinion mailed Aug. 11, 2009 in PCT/US2009/001872 filed Mar. 24, 2009", (Nov. 2009).
Website article "Ammonium Polyphosphate Center—Description and Benefits" http://www.specialchem4polymers.com. (Mar. 2008).

* cited by examiner

*Primary Examiner* — John Cooney
(74) *Attorney, Agent, or Firm* — Dilworth IP LLC

(57) ABSTRACT

A method for improving the thermal stability of polyurethane-modified polyisocyanurate (PU-PIR) foams is provided. Moreover, a process for producing the PU-PIR foams exhibiting improved thermal stability is provided. The foams have incorporated therein a high molecular weight ammonium polyphosphate (APP). APP is employed as a partial or complete substitute for flame retardants conventionally employed in PU-PIR foams. The foams of the invention exhibit excellent and improved thermal stability characteristics as compared to foams to which no APP has been added.

5 Claims, No Drawings

PROCESS FOR POLYURETHANE-MODIFIED POLYISOCYANURATE FOAM WITH IMPROVED THERMAL STABILITY

CROSS-REFERENCE TO RELATED APPLICATIONS

This application is a continuation of prior application Ser. No. 12/080,109, filed Apr. 1, 2008 now abandoned.

FIELD OF THE INVENTION

This invention relates to polyurethane-modified polyisocyanurate (PU-PIR) foam exhibiting improved thermal stability. The foam has incorporated therein a thermal stability-improving amount of a high molecular weight ammonium polyphosphate (APP). The APP-containing foams of the invention exhibit thermal stability improvements of as high as about 40-50% compared to foams to which no APP has been added.

BACKGROUND OF THE INVENTION

Polyurethane-modified polyisocyanurate (PU-PIR) foam is a closed-cell rigid foam that has found great utility in the commercial roofing market. This material is used primarily as a component in roofing board due to its ability to provide superior insulation, mechanical strength, and capacity to satisfy certain building code regulations related to fire performance and structural integrity under intense heat.

The polymer comprising the foam structure contains a preponderance of polyisocyanurate chemical linkages formed from the self-reaction of polymeric polyisocyanate, yielding a 6-membered ring structure containing three isocyanates. In general, the polyisocyanurate group is known to impart relatively good flammability performance due to limited flame-spread propensity and low smoke generation inherent with the polymer. Specific industry tests used to assess flame-spread propensity and smoke generation include the FM E-84 tunnel and the UL-790 Spread-of-Flame tests. The polyisocyanurate group is also known to impart excellent thermal stability to the polymer since polyisocyanurate bonds generally remain intact and resist decomposition upon exposure to intense heat. Thermal stability is critical in order to meet industry standard regulations since structural integrity of the polymer and/or composite upon exposure to heat ultimately dictates the outcome of the test. Specific industry tests that assess structural stability under burning conditions include the Factory Mutual Research Center Construction Materials Calorimeter Standard #4470 (known as the FM calorimeter test) and the European Loss Prevention Council test.

Polyisocyanurate linkages are spaced by polyurethane linkages in PU-PIR foam. The polyurethane groups are formed simultaneously with the polyisocyanurate groups through reaction of polymeric polyisocyanate with polyol. The polyurethane linkages help reduce brittleness of the polymer, provide certain physical property enhancements, and contribute greatly to the overall processing ease of the reacting foam during the manufacturing process. However, polyurethane groups are generally known to detract from the flammability performance of the polymer due to their greater combustibility and increased smoke generation. Recently this issue has become increasingly important due to the more widespread use of flammable hydrocarbon blowing agents used to generate the foam's cellular structure. To a certain extent, overall flammability performance can be controlled through incorporation of certain classes of flame retardants which are generally known to be effective for these types of foams. Examples of such flame retardants include halogen-containing compounds, which are thought to interrupt flame propagation in the gas phase, and phosphorus-containing compounds, which are thought to help catalyze formation of a protective char layer upon exposure to a flame. Particularly useful and common flame retardants for this technology are compounds which combine the two elements, such as halogenated phosphate esters.

Incorporation of polyurethane bonds into a polyisocyanurate polymer matrix is also known to significantly reduce the thermal stability of the resulting polymer. The decomposition temperature of a typical polyurethane bond is approximately 100° C. lower than the typical polyisocyanurate linkage. Therefore, while incorporation of polyurethane into the polyisocyanurate structure provides several positive and essential benefits for this technology, performance in certain industry-standard tests requiring structural integrity upon exposure to heat may be compromised.

SUMMARY OF THE INVENTION

It is an object of the present invention to provide a means by which the thermal stability of PU-PIR foam can be improved to a substantial extent. It is another object of the present invention to provide a means by which the structural integrity of burning PU-PIR foam can be improved.

These and further objects of the present invention are obtained in a PU-PIR foam prepared from a reaction system comprising polyisocyanate, polyol, blowing agent, catalyst, surfactant and flame retardant, the improvement comprising substituting at least about 33% of the flame retardant on a weight basis with high molecular weight ammonium polyphosphate to improve the thermal stability of the APP-containing foam as compared to the thermal stability of a PU-PIR foam prepared under identical conditions as the APP-containing PU-PIR foam except for the inclusion of ammonium polyphosphate. "Thermal stability" as utilized herein is expressed as percent retention of foam weight at a certain temperature relative to the foam's initial weight at 100° C. The PU-PIR foam of the invention exhibits substantially improved thermal stability as compared to controls to which no ammonium polyphosphate has been added. Relative thermal stability improvements ranging from at least about 5% to as high as about 50% have been observed in the practice of the present invention. It has been unexpectedly found that substituting a portion of flame retardant with high molecular weight ammonium polyphosphate greatly increases the foam's resistance to thermal decomposition. The enhancement in thermal stability is particularly apparent in the 350° C.-800° C. temperature range under non-oxidizing (anaerobic) conditions. This temperature range is particularly significant since these temperatures are routinely achieved during burn events encountered in industry tests that rely on structural stability to meet performance requirements. The thermal stability of the ammonium polyphosphate-containing PU-PIR foam when measured at 800° C. under anaerobic conditions is improved by at least about 10% as compared to the thermal stability at 800° C. of a PU-PIR foam prepared under identical conditions as the ammonium polyphosphate-containing PU-PIR foam except for the substitution of ammonium polyphosphate. Significant improvement in the foam's resistance to thermally-induced decomposition is achieved even under circumstances wherein substantial amounts of halogenated phosphate ester flame retardant are removed from control formulations. Improvements in thermal stability are also observed when ammonium polyphosphate is substituted for substantial amounts of non-halogenated flame retardant in comparable formulations.

DETAILED DESCRIPTION OF THE INVENTION

Ammonium polyphosphate (APP) is an inorganic salt of polyphosphoric acid and ammonia. The chain length (n) of this polymeric compound is both variable and branched, and can be greater than 1000. Short and linear chain APPs (n<100) are more water sensitive and less thermally stable than long chain APPs (n>1000), which exhibit a very low water solubility (<0.1 g/100 ml). APP is a stable, non-volatile compound. Longer chain APP starts to decompose at temperatures above 300° C. to polyphosphoric acid and ammonia. Short chain APP will begin to decompose at temperatures above 150° C.

There are two main families of ammonium polyphosphate: crystal phase I APP (APP I) and crystal phase II APP (APP II). APP I is characterized by a variable linear chain length, showing a lower decomposition temperature (approx 150° C.) and a higher water solubility than APP II. The general structure of APP I is given below in FIG. 1. In APP I, n (number of phosphate units) is generally lower than about 100.

Figure 1: APP I Structure

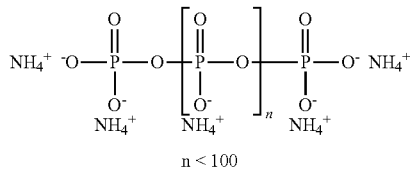

n < 100

As shown in FIG. 2 below, the APP II structure is cross linked/branched. The molecular weight is much higher than APP I with n being higher than about 200, and preferably higher than about 1000. APP II has a higher thermal stability (decomposition starts at approximately 300° C.) and a lower water solubility than APP I.

Figure 2: APP II Structure

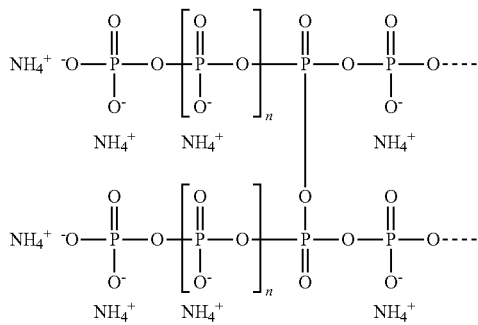

Ammonium polyphosphate utilized in accordance with the practice of the present invention preferably corresponds to crystal phase II APP. Such materials are readily available commercially; e.g., Exolit AP-422 from Clariant, FR Cros 484 from Budenheim, Antiblaze LR3 from Albemarle and APP1001 from Dgtech International.

In accordance with the present invention, APP is employed as a partial or complete substitute for conventional flame retardants employed in PU-PIR foams. It has been found that substituting from about 33% to about 100%, particularly from about 50% to about 100%, of flame retardant on a weight basis with APP yields significant and surprising improvements in thermal stability of the resulting foams. On a total weight basis, APP may represent from about 0.5 to about 10 weight percent of the total weight of the PU-PIR foams of the present invention.

Since APP is a solid material that does not readily provide long-term storage stability when premixed with polyol, APP can be added as a third stream at the mix head of conventional polyurethane foaming equipment. It can be added either as a pure solid at the mix head (with specialized equipment), or as a partial blend in one or more of the components present in the PU-PIR reaction system. For example, APP can be dispersed in the polyol or flame retardant (or combinations thereof) which act as a carrier for the APP, added as a third stream at the mix head, or in-line towards the mix head. Another mode of incorporation of APP into the PU-PIR foam includes dispersing APP along with a thixotropic agent into a component of the reaction system as a carrier. The thixotropic agent serves to thicken the viscosity of the dispersion, allowing for longer-term storage stability. An example of a thixotropic agent that may be advantageously employed in the practice of the invention is BYK-410, a polyurea material available from Byk Chemie. The blend of APP in a carrier containing a thixotropic agent can then be added to full resin batch blends. This blend can then be reacted with the other components of the reaction system in the normal way through conventional polyurethane foam mixing equipment.

The PU-PIR foam disclosed herein possesses a combination of isocyanurate and urethane linkages. Those skilled in the art will recognize that additional linkages such as urea and carbodiimide linkages may be found within the PU-PIR foams of the invention, depending on the specific starting reactants and polymerization conditions that are employed. Of the total isocyanate used in these compositions, some of it is trimerized or polymerized to form isocyanurate rings and some of it is reacted with one or more polyols to form urethane linkages. These compositions are formed by controlling the NCO/OH ratio of the isocyanate and polyol reactants so that a certain percentage of the total available isocyanate can react with the polyol to form urethane linkages and the remainder of the isocyanate can trimerize to form isocyanurate linkages. Generally, the NCO/OH ratio is maintained at from about 1.5 to 1 to about 50 to 1, particularly from about 1.8 to 1 to about 4 to 1 and the PU-PIR foams so produced will comprise a preponderance of isocyanurate linkages. The selection and control of these parameters is well within the ambit of the ordinary skilled artisan.

The polyisocyanate, polyol, blowing agent, catalyst, surfactant and flame retardant which are utilized in the practice of the present invention are well known in the polyisocyanurate/polyurethane arts and likewise are not particularly limited insofar as their specific selection is concerned. Other components commonly employed in PU-PIR foams such as pigments, foam modifiers, etc. may optionally be employed.

The polyisocyanate starting components which may be used in the present invention include aliphatic, cycloaliphatic, araliphatic, aromatic and heterocyclic polyisocyanates. Examples include ethylene diisocyanate, tetramethylene-1,4-diisocyanate, hexamethylene-1,6-diisocyanate, dodecane-1, 12-diisocyanate, cyclobutane-1,3-diisocyanate, cyclohexane-1,3- and 1,4-diisocyanate and mixtures of these isomers, 1-isocyanato-3,3,5-trimethyl-5-isocyanatomethylcyclohexane, hexahydrotolylene-2,4- and 2,6-diisocyanate and mixtures of these isomers, hexahydrophenylene-1,3- and/or -1,4-diisocyanate, perhydrodiphenylmethane-2,4'- and/or 4,4'-diisocyanate, phenylene-1,3- and -1,4-diisocyanate, tolylene-2,4- and -2,6-diisocyanate and mixtures of these isomers, diphenylmethane-2,4'- and/or -4,4'-diisocyanate, naphthylene-1,5-diisocyanate, triphenyl methane-4,4',4"-triisocyanate, polyphenyl-polymethylene polyisocyanate which may be obtained by aniline/formaldehyde condensation followed by phosgenation and which have been described, for example, in British Patent Nos. 874,430 and 848,671, m- and p-isocyanatophenyl sulphonyl isocyanate according to U.S. Pat. No. 3,454,606, perchlorinated aryl polyisocyanate as described, for example, in U.S. Pat. No. 3,277,138, polyisocyanate containing carbodiimide groups as described in U.S. Pat. No. 3,152,162, the diisocyanates described in U.S. Pat. No. 3,492,330, polyisocyanates containing allophanate groups as described, for example, in British Patent No. 994,890, Belgian Patent No. 761,626 and Published Dutch Patent application No. 7,102,524, polyisocyanates containing isocyanurate groups as described, for example, in U.S. Pat. No. 3,001,973, in German Patent Nos. 1,022,789; 1,222,067 and 1,027,394 and in German Offenlegungsschriften Nos. 1,929,034 and 2,004,048, polyisocyanates containing urethane groups as described, for example, in Belgian Patent No. 752,261 or in U.S. Pat. No. 3,394,164, polyisocyanates containing acylated urea groups according to German Patent No. 1,230,778, polyisocyanates containing biuret groups as described, for example, in U.S. Pat. Nos. 3,124,605 and 3,201,372, and in British Patent No. 889,050, polyisocyanates prepared by telomerization reactions as described, for example in U.S. Pat. No. 3,654,016, polyisocyanates containing ester groups as mentioned, for example, in British Patent Nos. 965,474 and 1,072,956, in U.S. Pat. No. 3,567,763 and in German Patent No. 1,231,688, reaction products of the above-mentioned isocyanates with acetals according to German Patent No. 1,072,385, and polyisocyanates containing polymeric fatty acid groups as described in U.S. Pat. No. 3,455,883.

The distillation residues obtained from the commercial production of isocyanates and which still contain isocyanate groups may also be used, optionally dissolved in one or more of the above-mentioned polyisocyanates. Mixtures of the above-mentioned polyisocyanates may also be used.

The polyisocyanates which are readily available are generally preferred, for example, toluene-2,4- and -2,6-diisocyanate and mixtures of these isomers ("TDI"); polyphenyl polymethylene polyisocyanates which may be obtained by aniline/formaldehyde condensation followed by phosgenation ("crude MDI"); and, polyisocyanates containing carbodiimide groups, urethane groups, allophanate groups, isocyanurate groups, urea groups or biuret groups ("modified polyisocyanates").

Starting polyol components which may be employed in the manufacture of the PU-PIR foams of the invention are well known and have been described, for example, in High Polymers, Volume XVI. "Polyurethanes, Chemistry and Technology", by Saunders and Frisch, Interscience Publishers, New York, London, Volume I, 1962, pages 32-42 and pages 44 to 54 and Volume II, 1964, pages 5 and 6 and 198-199, and in Kunststoff-Handbuch, Volume VII, Vieweg-Hochtlen, Carl-Hanser-Verlag, Munich, 1966, for example, on pages 45 to 71.

Suitable polyols which may be employed in accordance with the present invention include polyesters containing at least two hydroxyl groups, as a rule having a molecular weight of from about 300 to about 10,000, in particular polyesters containing from 2 to 8 hydroxyl groups, preferably those having a molecular weight of from about 350 to about 700, more preferably from about 350 to about 600, wherein the acid component of these polyesters comprises at least 35%, preferably at least 40%, by weight of phthalic acid residues.

These polyesters containing hydroxyl groups include for example, reaction products of polyhydric, preferably dihydric and optionally trihydric, alcohols with phthalic acids or other polybasic, preferably dibasic, carboxylic acids. Instead of using the free phthalic acids or polycarboxylic acids, the corresponding acid anhydrides or corresponding acid esters of lower alcohols or mixtures thereof may be used for preparing the polyesters. Orthophthalic acids, isophthalic acids and/or terephthalic acids may be used as the phthalic acid. The optional polybasic-carboxylic acids may be aliphatic, cycloaliphatic, aromatic and/or heterocyclic and may be substituted, for example, with halogen atoms and/or may be unsaturated. The following are mentioned as examples: succinic acid, adipic acid, suberic acid, azelaic acid, sebacic acid, trimellitic acid, tetrahydrophthalic acid anhydride, hexahydrophthalic acid anhydride, endomethylene tetrahydro phthalic acid anhydride, glutaric acid anhydride, maleic acid, maleic acid anhydride, fumaric acid, dimeric and trimeric fats acids, such as oleic acid, optionally mixed with monomeric fatty acids. Suitable polyhydric alcohols include, for example, ethylene glycol, propylene glycol-(1,2) and -(1,3), diol-(1,8), neopentyl glycol, cyclohexane dimethanol 1,4-bis-hydroxymethylcyclohexane), 2-methyl-1,3-propane diol, glycerol, trimethylolpropane, hexanetriol-(1,2,6) butane triol-(1,2,4), trimethylolethane, pentaerythritol, quinitol, mannitol and sorbitol, methylglycoside, also diethylene glycol, triethylene glycol, tetrathylene glycol, polyethylene glycols, dibutylene glycol, and polybutylene glycols. The polyesters may also contain carboxyl end groups. Polyesters of lactones, such as ε-caprolactone, or hydroxycarboxylic acids, such as ω-hydroxycaproic acid, may also be used.

According to the present invention, polyethers containing at least one, generally from 2 to 8, particularly 3 to 6, hydroxyl groups and having a molecular weight of from about 100 to about 10,000 of known type may be used in the polyol blend. These are prepared, for example, by the polymerization of epoxides, such as ethylene oxide, propylene oxide, butylene oxide, tetrahydrofuran, styrene oxide, or epichlorohydrin, either on its own for example in the presence of $BF_3$, or by chemical addition of these epoxides, optionally as mixtures or successively, to starting components having reactive hydrogen atoms, such as alcohols or amines, for example water, ethylene glycol, propylene glycol-(1,3) or -(1,2), trimethylol propane, 4,4-dihydroxy diphenylpropane aniline, ammonia ethanolamine or ethylene diamine. Sucrose polyethers which have been described, for example in German Auslgeschrift Nos. 1,176,358 and 1,064,938 may also be used according to the present invention.

Among the corresponding polythioethers which may also be used are the condensation products obtained from thiodiglycol on its own and/or with other glycols, dicarboxylic acids, formaldehyde, aminocarboxylic acids or aminoalcohols should be particularly mentioned. The products obtained are polythio mixed ethers, polythio ether esters or polythio ether ester amides, depending on the co-components.

Polyhydroxyl compounds already containing urethane or urea groups may be employed in accordance with the invention. Addition products of alkylene oxides and phenyl/formaldehyde resins or of alkylene oxides and urea/formaldehyde resins are also suitable according to the present invention.

Polyols derived from natural fats and oils may also be advantageously employed in accordance with the invention.

Such polyols are known and disclosed, e.g., in U.S. Pat. Nos. 6,359,023, 6,433,121, and 7,125,950, the contents of which are incorporated herein particularly with respect to their teachings of polyols derived from natural fats and oils and methods of making them. Such "eco-polyols" are readily available commercially, e.g., Ecopol 123 (a soybean oil- and PET-resin containing polyester polyol) available from Ecopur.

Suitable blowing agents include, but are not limited to, halogenated hydrocarbons such as, for example, 2,2-dichloro-2-fluoroethane (HCFC-141b), 1,1,1,3,3-pentafluoropropane (HFC-245fa), water, and hydrocarbons such as pentane. Other suitable organic blowing agents include, for example, acetone, ethyl acetate, halogenated alkanes, such as methylene chloride, chloroform, ethylidene chloride, vinylidene chloride, and also butane, hexane, heptane or diethylether. The effect of a blowing agent may also be obtained adding compounds which decompose at temperatures above room temperature to liberate gases, such as nitrogen, for example, azo compounds, such as azoisobutyric acid nitrile. Other examples of blowing agents and details about the use of blowing agents may be found in Kunststoff-Handbuch, Volume VII, published by Vieweg-Hochtlen, Carl-Hanser-Verlag, Munich, 1966, for example, on pages 108 and 109, 433 to 455 and 507-510.

The catalyst system employed in the present invention comprises a trimerization catalyst and a urethane catalyst. Optionally, a compound which promotes carbodiimide linkages may also be employed. Representative compounds which promote carbodiimide linkages include aliphatic alcohols such as methyl alcohol and furfuryl alcohol; amino alcohols such as N,N-dialkylaminoalkanols, triethanolamine, N-2-hydroxyethylmorpholine and N,N,N',N'-tetrakis(2-hydroxypropyl)ethylene diamine and s-triazine compounds such as 2,4,6-tris(diethanolamino)-s-triazine, 2,4,6-tris(diisopropanolamino)-s-triazine, 2,4,6-tris(N-methylethanolamino)-s-triazine, and unsymmetrically substituted triazines.

Trimerization catalysts which are employed in the present invention include 1,3,5-tris(N,N-dialkylaminoalkyl)-s-hexahydrotriazines, the alkylene oxide and water adducts of 1,3,5-tris(N,N-dialkylaminoalkyl)-s-hexahydrotriazines, 2,4,6-tris(dimethylaminomethyl)phenol, o-, p- or a mixture of o- and p-dimethylaminomethylphenol and triethylene diamine or the alkylene oxide and water adducts thereof, amino acid salts, alkali metal carboxylates, such as potassium octoate and potassium acetate, alkali metal alkoxides, and organic boron-containing compounds. These compounds are well known in the art, as is their use as catalysts which promote isocyanurate linkages. The alkylene oxide and water adducts of a 1,3,5-tris(N,N-dialkylaminoalkyl)-s-hexahydrotriazine are generally prepared by reacting equimolar amounts of the hexahydrotriazine, alkylene oxide and water at a temperature of from about 10° C. to 80° C. for a period of from about five minutes to two hours, e.g., the propylene oxide and water adduct of 1,3,5-tris(N,N-dimethylaminopropyl)-s-hexahydrotriazine. See U.S. Pat. Nos. 3,746,709 and 3,766,103, the disclosures of which are hereby incorporated by reference. 2,4,6-Tris(dimethylaminomethyl)phenol as well as o-, p- and a mixture of o- and p-(dimethylaminomethyl)phenol are known compounds which are commercially available products sold by Rohm & Haas under the trade names DMP-30 and DMP-10. Triethylenediamine and the alkylene oxide and water adducts thereof are also well known. Amino acid salt catalysts suitable for use in the invention include those derived from sarcosine. Suitable amino salts derived from sarcosine include various N-(2-hydroxy or 2-alkoxy-5-alkylphenol)alkyl sarcosinates. The alkyl groups are independently $C_1$-$C_{18}$ alkyl groups and the alkoxy groups are $C_1$-$C_6$ alkoxy groups. Each of the sarcosinate derivatives includes a suitable counterion, such as, for example, sodium, potassium, magnesium, lithium, etc. These amino acid salts may be prepared according to the procedures set forth in U.S. Pat. No. 3,903,018. Representative amino acid salt catalysts are, for example, sodium N-(2-hydroxy-5-methylphenyl)methyl sarcosinate, sodium N-(2-hydroxy-5-ethylphenyl)methyl sarcosinate, sodium N-(2-hydroxy-5-butylphenyl)methyl sarcosinate, sodium N-(2-hydroxy-5-heptylphenyl) methyl sarcosinate, sodium N-(2-hydroxy-5-nonylphenyl) methyl sarcosinate, sodium N-(2-hydroxy-5-dodecylphenyl) methyl sarcosinate, potassium N-(2-hydroxy-5-nonylphenyl) methyl sarcosinate, lithium N-(2-hydroxy-5-nonylphenyl) methyl sarcosinate, and mixtures thereof.

The amount of trimerization catalyst which may be employed in the present invention is generally from about 0.01% to about 20% by weight based on the starting weight of polyol.

Urethane catalysts which are employed in the present invention are well known in the art and include the metal or organometallic salts of carboxylic acid and tertiary amines. Representative of such compounds are dibutyltin dilaurate, dibutyltin diacetate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846, 408. Tertiary airlines such as triethylenediamine, triethylamine, dimethylcyclohexylamine, dimethylethanolamine, pentamethyldiethylene triamine, methylmorpholine, trimethylpiperazine, N-ethylmorpholine and diethyl ethanolamine may also be employed as well as mixtures of any of the above. Generally, the amount of the urethane-promoting catalyst employed will be from about 0.01% to about 10% by weight based on the starting weight of polyol.

All of the above-mentioned catalysts may be used as mixtures. Presently preferred catalysts include pentamethyldiethylene triamine, potassium octoate and potassium acetate.

Surfactants which are employed in the present invention are likewise well known in the art and include but are not limited to the sodium salts of ricinoleic sulphonates, or salts of fatty acids and amines, such as oleic acid diethylamine or stearic acid diethanolamine, alkali metal or ammonium salts of sulphonic acids, such as dodecyl benzene sulphonic acid or dinaphthylmethane, disulphonic acid or of fatty acids, such as ricinoleic acid, or polymeric fatty acid polyether siloxanes, especially those which are water-soluble. These compounds generally have a polydimethyl siloxane group attached to a copolymer of ethylene oxide and propylene oxide. Foam stabilizers of this type have been described, for example, in U.S. Pat. Nos. 2,834,748, 2,917,480 and 3,629,308.

Flame retardants employed in the practice of the invention are not particularly limited and include the conventional halogenated flame retardants, non-halogenated flame retardants, and mixtures thereof typically employed in the manufacture of polyurethane and/or PU-PIR foams, e.g., halogenated and non-halogenated phosphates, polyphosphates, phosphonates and polyphosphonates. Examples of halogenated flame retardants include halogenated hydrocarbons and halogen-substituted phosphates such as tris-chloroisopropyl phosphate and tris-chloroethyl phosphate. Examples of non-halogenated flame retardants include phosphate esters such as trimethyl phosphate, triethyl phosphate, triphenyl phosphate, tris(isopropylphenyl)phosphate and oligomeric phosphate esters.

According to the present invention, it is also possible to use known cell regulators such as paraffins or fatty alcohols or dimethyl polysiloxanes, reaction retarders, pigments or dyes, stabilizers against ageing and weathering, plasticizers, fungistatic and bacteriostatic substances and fillers, such as barium sulphate, kieslguhr, carbon black or whiting.

All documents, e.g., patents and journal articles, cited above or below are hereby incorporated by reference in their entirety.

One skilled in the art will recognize that modifications may be made in the present invention without deviating from the spirit or scope of the invention. The invention is illustrated further by the following examples which are not to be construed as limiting the invention or scope of the specific procedures described herein.

The advantages of this invention further are illustrated by the following examples. The reactants, proportions and other specific conditions are presented as being typical and should not be construed to limit the invention.

EXAMPLES

Foam formulations of the invention, as well as control formulations used to evaluate the inventive foams appear in Tables 1a, 1b and 1c. The polyol backbone consists of either PA-based polyester polyol (STEPANPOL PS-2352), phthalic anhydride (PA)/terephthalic acid (TPA)-based polyester polyol (Stepan AGENT 2837-63; 65/35 PA/TPA), TPA-based Polyester Polyol (TERATE 254, available from Invista) or soybean-based polyol (ECOPOL 123, available from Ecopur). The flame retardant package contains either FYROL PCF (tris-chloroisopropylphosphate, available from Supresta), FYROL CEF (tris-chloroethylphosphate, available from Supresta), FYROL Triethyl Phosphate (available from Supresta) or FYROL PNX (oligomeric phosphate ester available from Supresta). In the foams of the invention, ammonium polyphosphate (EXOLIT AP-422, available from Clariant) replaces half of the PCF, CEF, Triethyl Phosphate (TEP), or PNX content on a weight basis such that the total concentration of APP matches the concentration of remaining phosphate ester (with the exception of Examples 8 and 9).

During formulation blending, resin components were hand-stirred in a plastic container prior to the addition of pentane. After the pentane was added, the blend was mixed for 1.5 minutes at >2500 rpm using a double-Conn mix blade. The resulting milky white resin blend was then poured into a quart jar and capped with a Teflon-coated lid. The material was conditioned to temperature and used within 2 hours of manufacture.

Foams were produced through a conventional hand mix procedure. MONDUR 489 polymeric isocyanate (Bayer) was cooled to 70° F. and pre-weighed into a quart-sized cup. The resin blend (cooled to 70° F.) was poured over the isocyanate at the proper ratio (all examples provided are at 250 index or 2.5 to 1 NCO/OH ratio). The combined material was then mixed at >2500 rpm for 6 seconds and poured either into a gallon-sized bucket or a 30"×13"×2" mold. Buckets were utilized to monitor foam reactivity and density. Thermogravimetric analysis samples were derived from free-rise molded foams poured with 360 g of total material. The molds were made in a predominantly horizontal flow direction (9°-15° angle) at 125° F. substrate temperature. The in-mold cure time was 15 minutes. The molded pads were subsequently cured at 200° F. for 24 hours prior to cutting for thermal stability (TGA) testing.

Thermogravimetric analysis was run using a Perkin Elmer Thermogravimetric Analyzer (PYRIS 1 TGA). The foam sample (1.5-3.0 mg) was placed under nitrogen (20 ml/min flow rate) and weighed on the extremely sensitive balance at 100° C. After an additional minute of equilibration the temperature was ramped from 100° C.-800° C. at a rate of 10° C./min while weight data (expressed as % weight loss) was collected as a function of temperature.

Control formulations of the study (i.e. formulations without APP) appear in Table 1a as Comparative Examples A, B, C, D and E. Formulations of the invention (i.e., containing APP) appear in Table 1a as Examples 1-5. Table 1b presents formulas for control formulations containing non-halogenated flame retardant (Comparative Examples F, G, and H) as well as formulations of the invention containing APP (Examples 6-9). Table 1c presents formulations containing soybean-based polyols, with Comparative Examples I and J being controls and Examples 10 and 11 being within the scope of the present invention.

The resistance to thermal decomposition of the PU-PIR foams resulting from these formulations is documented in Tables 2a, 2b and 2c, which present thermogravimetric analysis data. Thermogravimetric analysis (TGA) is a widely accepted analytical technique that provides an indication of relative thermal stability for the material under consideration. In this study, a known mass of foam has been heated from 100° C.-800° C. at a steady rate of 10° C./min. Thermal stability is expressed as percent retention of foam weight at a particular temperature relative to the foam's initial weight at 100° C. As expected, the greater the temperature, the greater the extent of polymer decomposition, and the lower the percent eight retention.

Examples 1, 2, 3, 4 and 5 in Table 1a represent PU-PIR formulations with half of the halogenated phosphate ester flame retardant concentration being replaced with ammonium polyphosphate (based on weight). Table 2a contains TGA results for these foams compared to the respective control foams. Table 3 shows the improvement in thermal stability in the PU-PIR foams of the invention relative to the comparative examples. As is apparent, significant improvement in thermal stability is achieved through the use of APP regardless of polyol or halogenated flame retardant used in the study. At 350° C., an average relative improvement of 14.5% in weight retention (9.5% absolute) is observed versus the control when APP is incorporated for half of the halogenated phosphate ester concentration. At 500° C. the average relative improvement in weight retention is 25.4% (10.9% absolute), while at 800° C. the average relative weight retention improvement is 34.5% (8.3% absolute), compared to the controls.

Examples 6, 7 and 8 in Table 1b represent PU-PIR formulations with half of the non-halogenated phosphate ester being replaced with ammonium polyphosphate. Table 2b compares TGA results of these foams to phosphate ester flame retardant-containing foams (Comparative Examples F, G and H) which do not contain ammonium polyphosphate. As Table 3 demonstrates, significant improvement in thermal stability coincides with the incorporation of ammonium polyphosphate at the expense of phosphate ester. The foam of example 9 (which contains only ammonium polyphosphate) exhibits the best overall thermal stability.

Examples 10 and 11 in Table 1c represent PU-PIR formulations wherein half of the halogenated phosphate ester is replaced with ammonium polyphosphate, and a soybean-based polyol is employed as a starting polyol reactant. Table 2c and Table 3 compare TGA results of these foams to halogenated phosphate ester-containing foams (Comparative Examples I and J) which do not contain ammonium polyphosphate. Significant improvements in thermal stability are observed with the incorporation of ammonium polyphosphate at the expense of halogenated phosphate ester.

The relative improvements in thermal stability that are tabulated in Table 3 demonstrate that the practice of the present invention provides average relative improvements of thermal stability in PU-PIR foams ranging from about 10% to about 30%.

The substantial improvements in thermal stability are surprising and unexpected considering no additional concentration of flame retardant has been incorporated into the PU-PIR foams of the invention. Without being bound by any particular theory, it is believed that the incorporation of ammonium polyphosphate helps to chemically capture and/or discourage the loss of polymer decomposition products into the gas phase during the heating/pyrolytic process. The fragmentation process is thought to occur most readily at urethane chemical linkage sites and/or bonds comprising polyol segments contained within the PU-PIR polymer. For this reason, the presence of APP appears effective regardless of the polyol or flame retardant used in the examples of the invention. The enhanced thermal stability of the polymer is expected to promote significant improvement in the performance of PU-PIR foam in tests that distinguish materials on the basis of structural integrity maintained during a thermal decomposition process or simulated fire event.

TABLE 1a

| Example/Comparative Example | Comparative Example A | Example 1 | Comparative Example B | Example 2 | Comparative Example C | Example 3 | Comparative Example D | Example 4 | Comparative Example E | Example 5 |
|---|---|---|---|---|---|---|---|---|---|---|
| STEPANPOL PS-2352 | 32.4 | 32.4 | — | — | 32.4 | 32.7 | — | — | — | — |
| Agent 2837-63 (PA/TPA)[1] | — | — | 34.8 | 35.1 | — | — | 35.3 | 35.1 | — | — |
| TERATE 254 | — | — | — | — | — | — | — | — | 32.6 | 32.6 |
| Water | 0.16 | 0.16 | 0.16 | 0.16 | 0.16 | 0.16 | 0.16 | 0.16 | 0.16 | 0.16 |
| Surfactant[2] | 0.81 | 0.81 | 0.81 | 0.81 | 0.81 | 0.82 | 0.82 | 0.82 | 0.81 | 0.81 |
| Polycat 5 | 0.07 | 0.07 | 0.08 | 0.08 | 0.07 | 0.07 | 0.08 | 0.08 | 0.07 | 0.07 |
| K-15 | 0.92 | 0.92 | 1.08 | 1.09 | 0.92 | 0.93 | 1.10 | 1.09 | 1.01 | 1.01 |
| n-Pentane | 6.7 | 6.7 | 6.7 | 6.7 | 6.7 | 6.0 | 6.7 | 6.7 | 6.9 | 6.9 |
| PCF[3] or [CEF[3]] | 3.5 | 1.75 | 3.5 | 1.75 | [3.5] | [1.75] | [3.5] | [1.75] | 3.5 | 1.75 |
| APP[4] | — | 1.75 | — | 1.75 | — | 1.75 | — | 1.75 | — | 1.75 |
| Isocyanate/Resin Ratio[5] | 55.4/44.6 | 55.4/44.6 | 52.8/47.2 | 52.6/47.4 | 55.4/44.6 | 55.8/44.2 | 52.3/47.7 | 52.6/47.4 | 54.9/45.1 | 54.9/45.1 |
| Initiation Time[6] | 14 sec | 13 sec | 11 sec | 13 sec | 12 sec | 11 sec | 13 sec | 12 sec | 16 sec | 17 sec. |
| Gel Time | 43 sec | 42 sec | 38 sec | 42 sec | 38 sec | 41 sec | 44 sec | 41 sec | 43 sec | 44 sec |
| Tack Free Time | 64 sec | 60 sec | 60 sec | 59 sec | 60 sec | 60 sec | 62 sec | 59 sec | 57 sec | 57 see |
| Cup Density | 1.74 pcf | 1.65 pcf | 1.73 pcf | 1.73 pcf | 1.71 pcf | 1.70 pcf | 1.71 pcf | 1.74 pcf | 1.83 pcf | 1.84 pcf |
| Pad Core Density[7] | 1.83 pcf | 1.75 pcf | 1.76 pcf | 1.71 pcf | 1.81 pcf | 1.77 pcf | 1.72 pcf | 1.72 pcf | 1.83 pcf | 1.82 pcf |

[1]PA/TPA (Agent 2837-63 is 65% PA/35% TPA polyester polyol, OHV = 205, AV = 2.1)
[2]L-6900 used for PA formulations; B-8513 used for PA/TPA and TPA formulations
[3]PCF is tris-isopropylchlorophosphate, available from Supresta as FYROL PCF. CEP is tris-chloroethylphosphate, available from Supresta as FYROL CEF
[4]APP is ammonium polyphosphate, available from Clariant as EXOLIT AP-422
[5]All foams made with MONDUR 489 polymeric isocyanate at 250 index
[6]Components hand-mixed at 70° F., for 6 seconds and poured into a one gallon cup
[7]Pad core densities obtained from molded test samples. Foam pads were molded at 125° F., demolded after 15 minutes and post cured at 200° F. for 24 hours TABLE 1b

| Example/Comparative Example | Comparative Example F | Example 6 | Comparative Example G | Example 7 | Comparative Example H | Example 8 | Example 9 |
|---|---|---|---|---|---|---|---|
| Agent 2837-63 (PA/TPA)[8] | 35.2 | 35.0 | 35.1 | 35.1 | 35.1 | 35.1 | 35.1 |
| Water | 0.16 | 0.16 | 0.16 | 0.16 | 0.16 | 0.16 | 0.16 |
| Surfactant[9] | 0.81 | 0.81 | 0.81 | 0.81 | 0.81 | 0.81 | 0.81 |
| Polycat 5 | 0.08 | 0.08 | 0.08 | 0.08 | 0.08 | 0.08 | 0.08 |
| K-15 | 1.05 | 1.05 | 1.05 | 1.05 | 1.05 | 1.05 | 1.05 |
| n-Pentane | 6.5 | 6.8 | 6.8 | 6.8 | 6.8 | 6.8 | 6.8 |
| TEF[10] | 3.5 | 1.75 | — | — | 1.75 | 1.17 | — |
| PNX[10] | — | — | 3.5 | 1.75 | 1.75 | 1.17 | — |
| APP[11] | — | 1.75 | — | 1.75 | — | 1.17 | 3.5 |
| Isocyanate/Resin Ratio[12] | 52.7/47.3 | 52.5/47.5 | 52.5/47.5 | 52.5/47.5 | 52.5/47.5 | 52.5/47.5 | 52.5/47.5 |
| Initiation Time[13] | 13 sec | 13 sec | 13 sec | 12 sec | 12 sec | 13 sec | 14 sec |
| Gel Time | 38 sec | 43 sec | 41 sec | 40 sec | 40 sec | 44 sec | 45 sec |
| Tack Free Time | 46 sec | 53 sec | 51 sec | 51 sec | 50 sec | 52 sec | 56 sec |
| Cup Density | 1.78 pcf | 1.80 pcf | 1.77 pcf | 1.78 pcf | 1.78 pcf | 1.73 pcf | 1.77 pcf |
| Pad Core Density[14] | 1.82 pcf | 1.77 pcf | 1.79 pcf | 1.80 pcf | 1.80 pcf | 1.76 pcf | 1.77 pcf |

[8]PA/TPA (Agent 2837-63 is 65% PA/35% TPA polyester polyol, OHV = 205, AV = 2.1)
[9]Tegostab B-8513 available from DeGussa
[10]TEP is triethyl phosphate, available from Supresta as FYROL Triethyl Phosphate. PNX is oligomeric phosphate ester, available from Supresta as FYROL PNX
[11]APP is ammonium polyphosphate, available from Clariant as EXOLIT AP-422
[12]All foams made with MONDUR 489 polymeric isocyanate at 250 index
[13]Components hand-mixed at 70° F. for 6 seconds and poured into a one gallon cup
[14]Pad core densities obtained from molded test samples. Foam pads were molded at 125° F., demolded after 15 minutes and post cured at 200° F. for 24 hours TABLE 1c

| Example/Comparative Example | Comparative Example I | Example 10 | Comparative Example J | Example 11 |
|---|---|---|---|---|
| Agent 2837-63 (PA/TPA)[15] | 16.75 | 16.75 | — | — |
| ECOPOL 123[16] | 16.75 | 16.75 | 31.8 | 31.8 |
| Water | 0.16 | 0.16 | 0.16 | 0.16 |
| Surfactant[17] | 0.80 | 0.80 | 0.79 | 0.79 |
| Polycat 5 | 0.09 | 0.09 | 0.11 | 0.11 |
| K-15 | 1.23 | 1.23 | 1.51 | 1.51 |
| n-Pentane | 6.0 | 6.0 | 6.0 | 6.0 |
| PCF[18] | 3.5 | 1.75 | 3.5 | 1.75 |
| APP[19] | — | 1.75 | — | 1.75 |
| Isocyanate/Resin Ratio[20] | 54.7/45.3 | 54.7/45.3 | 56.1/43.9 | 56.1/43.9 |
| Initiation Time[21] | 15 sec | 15 sec | 17 sec | 17 sec |
| Gel Time | 43 sec | 45 sec | 45 sec | 47 sec |
| Tack Free Time | 55 sec | 55 sec | 52 sec | 57 sec |
| Cup Density | 1.70 pcf | 1.70 pcf | 1.70 pcf | 1.69 pcf |
| Pad Core Density[22] | 1.78 pcf | 1.77 pcf | 1.74 pcf | 1.76 pcf |

[15]PA/TPA (Agent 2837-63 is 65% PA/35% TPA polyester polyol, OHV = 205, AV = 2.1)
[16]ECOPOL 123 is soybean oil- and PET resin-containing polyester polyol, available from Ecopur. OHV = 240, AV < 2.0
[17]Tegostab B-8513 available from DeGussa
[18]PCF is tris-isopropylchlorophosphate, available from Supresta as FYROL PCF
[19]APP is ammonium polyphosphate, available from Clariant as EXOLIT AP-422
[20]All foams made with MONDUR 489 polymeric isocyanates at 250 index
[21]Components hand-mixed at 70° F. for 6 seconds and poured into a one gallon cup
[22]Pad core densities obtained from molded test samples. Foam pads were molded at 125° F., demolded after 15 minutes and post cured at 200° F. for 24 hours TABLE 2a

| Example/Comparative Example | P.R. Package (% in Foam) | Polyester Polyol [Anhydride] | % Wt. Ret. @350° C. | % Wt. Ret. @400° C. | % Wt. Ret. @500° C. | % Wt. Ret. @650° C. | % Wt. Ret. @800° C. |
|---|---|---|---|---|---|---|---|
| Comparative Example A | PCF (3.5) | PS-2352 [PA] | 62.5% | 49.9% | 41.4% | 34.1% | 21.0% |
| Example 1 | PCF (1.75) + AP-422 (1.75) | PS-2352 [PA] | 73.0% | 60.5% | 52.7% | 41.9% | 30.9% |
| Comparative Example B | PCF (3.5) | Agent 2837-63 [65/35 PA/TPA] | 66.6% | 53.0% | 43.4% | 35.6% | 25.6% |
| Example 2 | PCF (1.75) + AP-422 (1.75) | Agent 2837-63 [65/35 PA/TPA] | 77.6% | 62.7% | 54.8% | 42.9% | 34.1% |
| Comparative Example C | CEF (3.5) | PS-2352 [PA] | 64.7% | 49.4% | 40.3% | 34.0% | 24.1% |
| Example 3 | CEF (1.75) + AP-422 (1.75) | PS-2352 [PA] | 75.4% | 60.6% | 53.7% | 42.8% | 33.7% |
| Comparative Example D | CEF (3.5) | Agent 2837-63 [65/35 PA/TPA] | 66.3% | 51.8% | 43.5% | 35.7% | 23.9% |
| Example 4 | CEF (1.75) + AP-422 (1.75) | Agent 2837-63 [65/35 PA/TPA] | 75.6% | 62.2% | 55.1% | 43.0% | 33.8% |
| Comparative Example E | PCF (3.5) | Terate 254 [TPA] | 68.3% | 60.0% | 49.4% | 40.6% | 32.9% |
| Example 5 | PCF (1.75) + AP-422 (1.75) | Terate 254 [TPA] | 74.3% | 65.7% | 56.0% | 44.9% | 36.5% |

TABLE 2b

| Example/Comparative Example | F.R. Package (% in Foam) | Polyester Polyol [Anhydride] | % Wt. Ret. @350° C. | % Wt. Ret. @400° C. | % Wt. Ret. @500° C. | % Wt. Ret. 650° C. | % Wt. Ret. @800° C. |
|---|---|---|---|---|---|---|---|
| Comparative Example F | TEP (3.5) | Agent 2837-63 [65/35 PA/TPA] | 67.9% | 56.4% | 47.0% | 37.7% | 27.6% |
| Example 6 | TEP (1.75) + AP-422 (1.75) | Agent 2837-63 [65/35 PA/TPA] | 74.1% | 61.4% | 52.1% | 38.8% | 28.1% |
| Comparative Example G | PNX (3.5) | Agent 2837-63 [65/35 PA/TPA] | 77.8% | 60.4% | 48.8% | 37.4% | 25.3% |
| Example 7 | PNX (1.75) + AP-422 (1.75) | Agent 2837-63 [65/35 PA/TPA] | 76.0% | 63.8% | 55.4% | 42.4% | 34.1% |
| Comparative Example H | TEP (1.75) + PNX (1.75) | Agent 2837-63 [65/35 PA/TPA] | 73.0% | 54.8% | 43.9% | 34.6% | 23.1% |
| Example 8 | TEP (1.17) + PNX (1.17) + APP (1.17) | Agent 2837-63 [65/35 PA/TPA] | 79.8%. | 64.8% | 55.7% | 42.7% | 29.7% |
| Example 9 | APP (3.5) | Agent 2837-63 [65/35 PA/TPA] | 77.7% | 65.5% | 57.7% | 45.4% | 36.7% |

TABLE 2c

| Example | F.R Package (% in Foam) | Polyester Polyol | % Wt. Ret. @350° C. | % Wt. Ret. @400° C. | % Wt. Ret. @500° C. | % Wt Ret 650° C. | % Wt. Ret. @800° C. |
|---|---|---|---|---|---|---|---|
| Comparative Example I | PCF (3.5) | Agent 2837-63/Ecopol 123 | 75.3% | 62.8% | 49.1% | 35.9% | 20.1% |
| Example 10 | PCF (1.75) + AP-422 (1.75) | Agent 2837-63/Ecopol 123 | 78.4% | 65.0% | 51.1% | 37.7% | 24.5% |

TABLE 2c-continued

| Example | F.R Package (% in Foam) | Polyester Polyol | % Wt. Ret. @350° C. | % Wt. Ret. @400° C. | % Wt. Ret. @500° C. | % Wt. Ret 650° C. | % Wt. Ret. @800° C. |
|---|---|---|---|---|---|---|---|
| Comparative Example J | PCF (3.5) | Ecopol 123 | 73.2% | 64.1% | 51.1% | 38.7% | 23.8% |
| Example 11 | PCF (1.75) + AP-422 (1.75) | Ecopol 123 | 78.3% | 67.9% | 52.4% | 39.4% | 26.1% |

What is claimed is:

1. A method which comprises preparing a polyurethane-modified polyisocyanurate (PU-PIR) foam by reacting polymeric MDI, an aromatic polyester polyol, and water in the presence of a blowing agent, a urethane catalyst, a trimerization catalyst, a surfactant, and a flame retardant composition, wherein at least 33 wt. % of the flame retardant composition is crystal phase II ammonium polyphosphate, wherein the PU-PIR foam is formulated at an NCO/OH index within the range of 1.8:1 to 4:1, and wherein the PU-PIR foam has a thermal stability as measured at 800° C. under anaerobic conditions that is at least 10% higher than the thermal stability of a PU-PIR foam prepared under identical conditions at the same flame retardant level in the absence of the ammonium polyphosphate.

2. The method of claim 1 wherein at least 50 wt. % of the flame retardant composition is crystal phase II ammonium polyphosphate.

3. The method of claim 1 wherein the PU-PIR foam has a thermal stability that is at least 30% higher than the thermal stability of a PU-PIR foam prepared under identical conditions at the same flame retardant level in the absence of the ammonium phosphate.

4. The method of claim 1 wherein the flame retardant composition further comprises a member selected from the group consisting of halogenated and non-halogenated phosphates, polyphosphates, phosphonates, polyphosphonates, and mixtures thereof.

5. The method of claim 1 wherein the PU-PIR foam comprises 0.5 to 10 wt. % of the ammonium polyphosphate.

* * * * *